United States Patent [19]

Potter

[11] 4,342,539

[45] Aug. 3, 1982

[54] RETRACTABLE WIND MACHINE

[76] Inventor: James A. Potter, 12 Greenhouse Blvd., West Hartford, Conn. 06110

[21] Appl. No.: 12,055

[22] Filed: Feb. 13, 1979

[51] Int. Cl.³ .............................................. F03D 11/04
[52] U.S. Cl. .................................... 416/9; 416/132 B; 416/142; 416/170 R
[58] Field of Search .................... 416/142 R, 142 B, 9, 416/DIG. 6, 121 A, 132 B, 240 A, 170 A, 83, 65

[56] References Cited

U.S. PATENT DOCUMENTS

| 215,035 | 5/1879 | Alden | 416/132 B |
|---|---|---|---|
| 282,122 | 7/1883 | Schramm | 416/132 B |
| 355,922 | 1/1887 | Holm et al. | 416/240 A X |
| 476,716 | 6/1892 | Winge | 416/240 A X |
| 593,170 | 11/1897 | White | 416/240 A |
| 1,430,406 | 9/1922 | Schultkes et al. | 416/132 B |
| 2,177,801 | 10/1931 | Erren | 416/121 A |
| 2,596,726 | 5/1952 | Rydell | 416/4 |
| 2,713,392 | 7/1955 | Von Karman et al. | 416/142 B X |
| 3,222,533 | 12/1965 | MacKay | 416/170 A X |
| 4,039,849 | 8/1977 | Mater et al. | 416/197 A |
| 4,066,911 | 1/1978 | Sarchet | 416/132 B X |
| 4,110,631 | 8/1978 | Salter | 416/121 A X |
| 4,118,637 | 10/1978 | Tackett | 416/197 A X |
| 4,191,507 | 3/1980 | DeBerg | 416/240 A |
| 4,208,168 | 6/1980 | Chen et al. | 416/197 A X |

FOREIGN PATENT DOCUMENTS

| 736454 | 6/1943 | Fed. Rep. of Germany | 416/9 |
|---|---|---|---|
| 830180 | 1/1952 | Fed. Rep. of Germany | 416/121 A |
| 1628140 | 2/1970 | Fed. Rep. of Germany | 416/197 A |
| 371096 | 4/1932 | United Kingdom | 416/121 A |

Primary Examiner—Everette A. Powell, Jr.

[57] ABSTRACT

Wind energy is converted in a system having a telescoping, rotating, tiltable tower. A variable number of airfoil members is unfurled in accordance with the area of wind stream to be swept. The tiltable windmill rotating mast is a telescoping tower, which is retracted into storage mode, usually during dangerous windstorms. Each intermediate telescoping member carries a supporting member for an airfoil above and below such support, so that all sails are taut only when the tower is fully raised. Sails can be flapping when only partially raised. The number of sails unfurled is adjustable by reason of such telescoping mast. Resilient means urge the rotatable mast into a truly vertical position, while permitting such mast to tilt not more than a controlled angle in response to the wind, thereby permitting the airfoils more efficiently to rotate the mast. A plurality of transmission systems direct the power from the rotating mast to output means, so that when slight winds are producing minimum power, the frictional forces inherent in the heavy duty power transmission are not encountered. The strain imposed upon base members by the tilting of the rotating tower monitors the severity of wind at the airfoils, so that the strain gauges provide an alarm system for dangerous wind velocities.

Other manifestations of the invention comprise improvements for one or another of wind energy conversion sub-systems such as wind-magnetic transducers, wind-electric transducers and horizontal axis wind turbines.

21 Claims, 7 Drawing Figures

RETRACTABLE WIND MACHINE

RELATED APPLICATIONS

This is the first of what is expected to be a series of related patent applications.

FIELD OF INVENTION

This invention relates to wind machines.

BACKGROUND OF THE INVENTION

McLean Ser. No. 766,648 describes a windmill having a vertical axis and means for protecting the airfoils from damage during severe wind storms.

Shaffer U.S. Pat. No. 1,003,661 positions a wind turbine near the ground, and provides a collapsable canvas tube which can be raised to a height for capturing higher level winds for actuating the turbine.

Savonius U.S. Pat. No. 1,697,574 describes advantageous shapes for a pair of airfoils for a windmill.

Magoveny et al U.S. Pat. No. 3,938,907 describes vanes which are attended and withdrawn in response to the speed of the turbine.

Sarchet U.S. Pat. No. 4,066,911 shows a windmill driving a generator having a feedback system so that the tautness of the sails of the horizontally rotating airfoils is responsive to the generated voltage.

An article about "Windmills for Rural Use" by S. P. G. Raju et al presented at the Intl. Solar Energy Congress, held at New Delhi, Jan. 16–21, 1978 describes a vertical axis windmill having a pair of Savonius airfoils.

Although technologists have been seeking to build better windmills for many centuries, there has been an unsatisfied demand for apparatus which could be predominantly assembled in a factory, which could be suitable for a variety of locations of varying wind conditions, and which could safely withstand the stresses of windstorms.

My invention relates to various types of wind turbines such as those classified on pages 18 and 19 in the publication entitled *Wind Machines,* National Science Foundation, Superintendent of documents Stock No. 038-000-00272-4. Wind turbines sweeping a large enough area to yield substantial power during light winds are vulnerable to damage by wind loading of their components and support structures during high winds.

In the prior art, varieties of arrangements have been used to protect wind machines from damage during high winds, and the machine elements and their supports have been made large and strong in order to sustain the stresses due to wind loads and vibrations due to turbulence. Such structures are heavy and costly. They are subject to friction losses in their bearings due to the extra weight needed for reliability. This friction stops power output during light winds.

In the prior art wind turbine rotors have been elevated on towers so as to intercept faster winds. Equipment so elevated necessitates climbing up the tower or other support structure in order to gain access to the working parts. This is especially disadvantageous during inclement weather, when it might be necessary to climb to the working mechanism to secure some failed part against catastrophic damage.

In the prior art static transducers which convert wind energy directly into magnetic, electric, or thermal energy also must be exposed to the violence of various wind conditions; and so they, too are subject to damage in wind gusts. The cost of mounting such static transducers is high due to the extra material and additional strengthening members needed.

One kind of wind machine whose advantages have been devalued because of the above-described considerations is the kind identified in the above-referenced page 19 as the Split Savonius wind machine. A rotor of this shape was disclosed in U.S. Pat. No. 1,200,308 issued in 1916 to J. C. Bunnell under the title *Water Motor.* The Savonius rotor is disclosed in U.S. Pat. No. 1,697,574 issued in 1929 to S. J. Savonius under the title: *Rotor Adapted To Be Driven By Wind Or Flowing Water.* Numerous reports or practical applications, experimental studies, and theoretical analyses are referenced in *Wind Tunnel Performance Data For Two-And Three-Bucket Savonius Rotors,* Sandia Laboratories Energy Report No. SAND76-0131, printed July 1977. Still other publications describe the constructions of Savonius split rotors by means of fabric and supporting wires so that the blades of the rotor are actually sails stiffened with taut wires. One such paper was presented at the Solar Energy Congress in New Delhi, India in January 1978, and was titled: *Windmills For Rural Use.* The Authors were Professor S. P. Govinda Raju and Professor R. Narasimha, Indian Institute of Science, Bangalore-12, India. The design reported in this paper describes joints in the tension wires so constructed as to yield and slacken the sails during high winds, and thus unload the structure. This and other developments have improved the ability of Split Savonius rotors to withstand high winds without excessive costs, but it has nonetheless been concluded by some skilled in the art that this kind of wind energy conversion system is not worth developing commercially.

However, the development of the split Savonious continues. In the above-cited report SAN76-0131, we find in the introduction the statement: ". . . because the technology required to fabricate a Savonious rotor is considerably less than that required for more sophisticated types of wind turbines, Savonius rotors may find more applications in developing countries as well as in do-it-yourself projects."

In designing wind energy conversion systems to convert the most energy per unit expense, not only is it necessary to intercept a large cross section of the wind, but it is also desirable to intercept the wind at higher elevations above ground. The publication *Weatherwise,* Vol. 27, No. 6, Dec. 1974, page 239, FIG. 4, portrays the increase of the power in the wind at heights. Much more power is gained from a given wind by additional elevation of the airfoils intercepting the wind.

SUMMARY OF THE INVENTION

In accordance with certain embodiments of the present invention, a windmill is provided with a tower which can be raised or lowered so that the airfoils can be lowered into storage areas during windstorms, and so that the tower can be predominantly assembled at a factory, shipped in lowered condition, and raised to its operating height readily after arriving at the site of use.

In accordance with certain embodiments of the present invention a rotatable mast is resiliently urged to maintain a standard vertical position, but is tiltable to a controlled angle so that the airfoils may more efficiently utilize the relatively strong winds, and so that the monitoring the troublesomely strong winds can be detected at the base of the apparatus for initiating the lowering of the apparatus for storage mode during windstorms.

In accordance with certain embodiments of the invention, the raising and lowering of the rotatable mast utilizes telescoping members.

In certain embodiments of the invention, each of a plurality of upper telescoping members carries supports for sails, which can be either taut or flappy, depending upon the telescopic adjustment, and either operative or in storage, depending upon the telescopic adjustment.

In accordance with certain embodiments of the invention, a plurality of power transmission systems, involving various degrees of friction and involving different capacities for power transmission, are provided, so that during light winds the windmill can transmit power without being burdened with the friction inherent in a heavy duty power transmission system.

Two of the disadvantages of the various kinds of wind energy conversion systems now available are their vulnerability to damage by strong winds, and the difficulty of access to working parts for adjustment and repair. The present invention gives reduced suseptibility to wind damage and facilitates repair by reason of employing unspecialized technology furnished by local craftsmen and by permitting easy access to the working parts of the system.

My invention permits the interception of the power in air moving above the main structure, where the winds are stronger, without having to make the whole structure weather-worthy in the highest winds expected.

My invention originates a system and equipment having retractable members which extract energy from the wind. The degree of deployment of the members is adjusted to intercept a large wind stream cross section during light winds and to intercept a smaller wind cross sectional area during high winds.

The power take-off devices are arranged to disengage the heavier power transmission members to limit friction during light winds, and engages for full power during strong winds. Light-duty low-friction power take off elements remain engaged during light winds so as to convert whatever small amount of energy can be had then. It is a feature of my invention that the configuration of the blades, runners, bearings, supports and other parts of the system, in conjunction with the power take-off devices, brings about the conversion of power in the wind gusts and the energy stored momentarily in the oscillations of structural members into mechanical power output.

Maintenance and adjustment are facilitated because the intrinsic spacing of the members provides crawl spaces for service personnel; and because the mechanisms used for positioning the blades can be used to position parts for easy reach of service-persons.

Interrelated moving parts are elastically pre-stressed into engagement with each other so as to be self-adjusting and to resist malfunction due to jamming or disengagement when the strains due to wind forces are applied. Blades are furled and unfurled in suspension between telescoping runners. The mechanism for moving the telescoping runners within each other is an integral part of the structure of runners, and is driven in either the furl or unfurl sense as demanded by the force-limitation requirement of the design. Telescoping members are secured to each other at the extremes of their travel by latches in some designs, and simply by end-condition forces applied by the hoist drive.

Some of the novel features of my invention relate to the devices for unfurling and retracting blades, sails, towers, and and other members of the wind energy conversion system. Other novel features relate to manual and automatic control of the deployment of the blades. Still other novel features relate to idling the moving parts in large bearings when only light winds are blowing.

Although I prefer to design my invention into a vertical axis windmill of the split Savonius type, some of its novel features are applicable to horizontal axis windmills, as well as to some of the innovative wind energy conversion systems such as those employing magnetic, thermal or electric transducers to accomplish wind energy conversion. No matter what kind of wind energy conversion device is used, it must intercept a wind stream of substantial cross section to convert a substantial amount of energy. Using certain features of my invention, any innovative transducer can be mounted so that it, together with its auxiliary members, can be deployed into the wind stream and retracted therefrom to accomplish the purposes of my invention. Any such transducer can be mounted on the uppermost telescoping runner of my invention. The rotary bearings can be used one way or another to direct the transducer into the wind.

When my invention is applied to a vertical axis wind turbine a central ground supported bearing cooperates with other bearings, and is resiliently restrained so that the main part of the rotor structure leans and flexes in a direction and degree related to the force and direction of the wind. It is a feature of my invention that this response to the wind causes modification of the engagement of the drive ring on the rotor with its power-take-off-driven-members and bearings. An outer ring of the rotor is provided with a friction surface so that it can engage a stationary member in a rubbing manner so as to constitute a brake and heat generator.

The furlable blades are held taut when fully deployed, but are limp between the telescoping members supporting them while retraction is taking place. They are, in effect, sails which are gathered by ropes to prevent fouling. The manner in which these restraining lines, which are also used to shape the blades in full deployment, are manipulated and driven is an essential part of my invention. Ribs are also used to shape the blades.

My invention, as hereinafter described, discloses lightweight, durable, cost-effective equipment to extract energy from the wind and convert it into machanical, thermal, magnetic, fluid or electrical energy.

The nature of the invention is further clarified by some descriptions of preferred embodiments and by some descriptions of general concepts illustrated by such embodiments.

DESCRIPTION OF THE DRAWINGS

In the accompanying drawings.

DETAILED DESCRIPTION

My invention may be made and used by those skilled in the art by the application of the principles and practice of mechanical, civil, chemical and electrical engineering published in handbooks or available commercially from engineering firms. This description of my invention, therefore, does not describe in detail such engineering and design considerations such as siting, sizing, material selection, fabrication technique, stress analysis, nor the design of familiar mechanisms.

It is well known that the amount of power that can be extracted from a given wind stream is approximately proportional to the area of the cross section of the wind intercepted by the energy converting members of the wind machine, the cross section being normal to the wind direction. My invention is operative in any size; but is most beneficially applicable to wind machines having areas for intercepting the wind in the range of 300 square feet to 10,000 square feet. The actual wind power converted into a usable output of mechanical energy for a machine of a given size (power being the time rate of energy flow) depends upon a number of factors, the most significant of which are: the wind velocity; the efficiency of the wind converting elements; and losses such as bearing friction and control power. These and other well-known engineering principles and commercially available fabrication techniques, together with the reading of the following description with reference to the drawings, make apparent the features and objects of my invention.

Figures 1, 2:
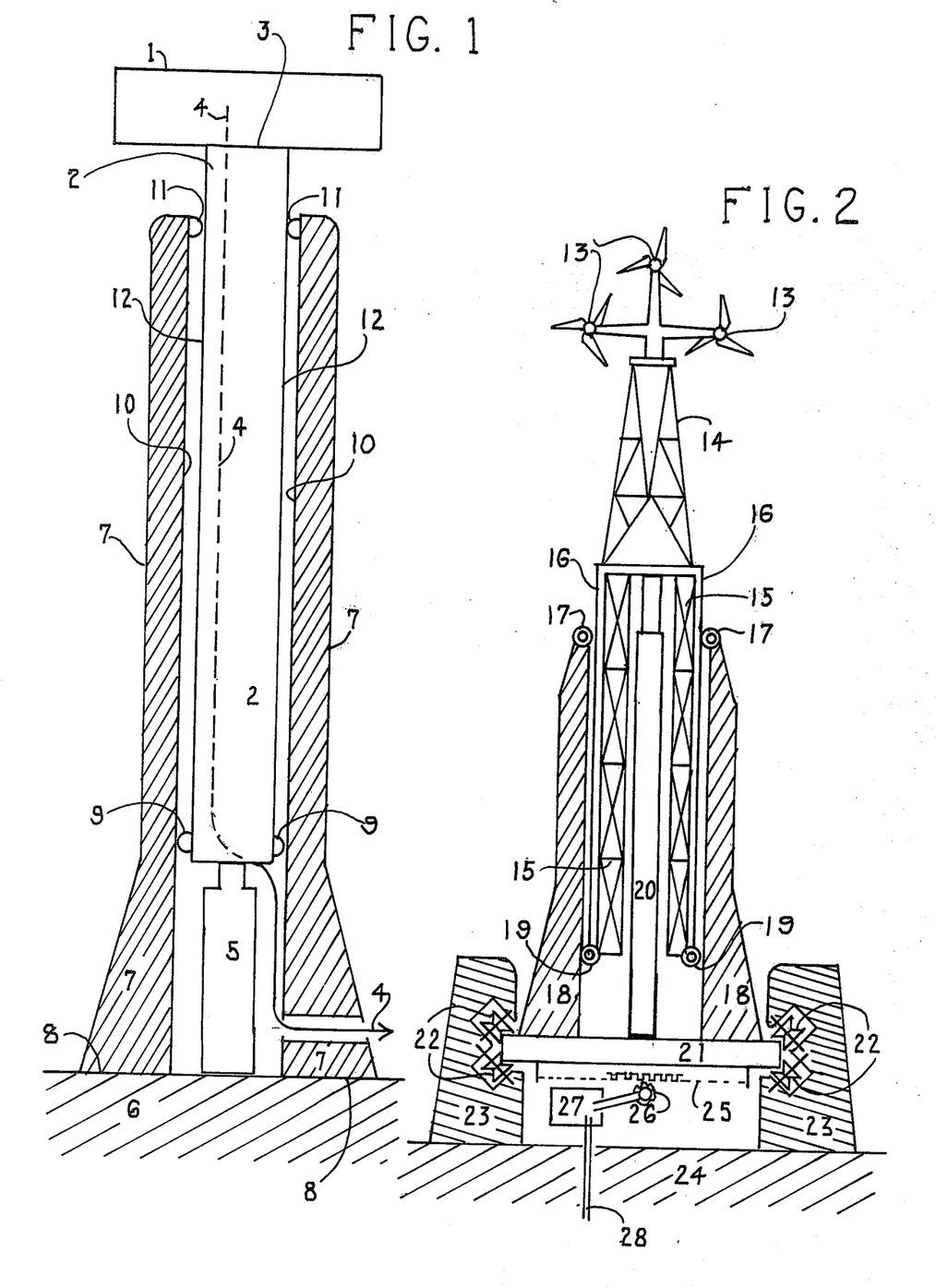
FIG. 1 is a schematic view of one embodiment, portions being in cross-section.
FIG. 2 is a schematic view of a second embodiment, portions being in cross-section.

In the embodiment shown in FIG. 1, a column 2 supports a wind machine 1. Attention is called to the fact that any of many types of wind machines can be employed. Among the wind machine types represented to be mounted at item 1 location are: wind-electric transducers, wind-magnetic transducers, wind-thermal transducers and the various wind machines named on pages 18 and 19 of *Wind Machines*, the publication referred to in the Background of the Invention.

Heretofore, many types of wind turbines have been damaged by windstorms, and some of the hesitancy about using windmills has been attributable to the need for obtaining the benefits of winds at higher level and the hazard of damage to windmills by windstorms.

Power is transmitted from a transducer 1 through a power transmission system to a useful load. Wind electric transducers, wind magnetic transducers, wind thermal transducers, are sometimes employed in lieu of a wind turbine. Wind turbines are often employed to operate electric generators or alternators by reason of the suitability of electric storage batteries for temporary storage of energy. The timing of energy demands only rarely coincides with the availability of windpower, and it is the capital cost, maintenance problems, etc. related to energy storage systems which has impaired usage of windmills.

Numerals 4 indicate that there is a path for the transmission of power from transducer 1 away from the wind energy conversion system to a useful load. The assembly comprising items 1, 2, 3 and 4 is supported and moved up and down by jack 5. A base 6 can provide a foundation for jack 5. The main support tower indicated by numerals 7 stand fixedly on base 6 and is anchored to it at interface 8. Bearings 9 are rigidly fixed to column 2 and roll or slide along vertical rails 12, which are reattached to sides of column 2.

Jack 5 may be designed and fabricated in any of a number of well known fashions, and may be controlled at will of an operator by manual control, or may be automatically controlled to raise and lower column 2. In light winds the wind machine 1 may be raised to its highest elevation so as to intercept the faster winds there. In strong winds the wind machine 1 can be lowered to avoid the fastest winds, and thus limit the overturning moment of the tower and limit the stresses within its structural members.

FIG. 2 illustrates three wind machines 13 fixed to tower 14, which tower is rigidly supported upon column 15. Column 15 is equipped with vertical rails 16 which run in track wheels 17, fixed to the hollow tower 18. Track wheels 19 whose axles are fixed to column 16 travel on rails attached vertically to the interior of hollow tower 18. The base members of 21 is integrally fixed to the tower 18 and supports jack 20. Base 21 is in the form of a disc, and the cylindrical surface of the disc and its top and bottom surfaces near its periphery constitute the inner race of a bearing supported by and anchored to the sub-base of ground 24. Ring gear 25 is concentrically attached to base 21, and is driven in rotation by gear 26. Gear box 27 drives gear 26, and is driven by its input shaft 28. The various parts of the wind energy conversion system diagrammed in FIG. 2 work together as follows: By well-known means not illustrated the wind is made to apply rotary power at shaft 28 to rotate the tower to follow the wind, so that the wind machines 13 face the wind for wind energy conversion. Independent of the rotary motion of the tower 14, jack 20 is made to drive the assembly comprising column 15, tower 14; and wind machines 13 upward and downward to move the wind machines vertically into and out of the higher wind stream. The simultaneous control of the jack 20 and the shaft 28 accomplish the objects of placing the wind machines 13 at the optimum height and optimum directional orientation, and obtaining the most power from the system consistent with economical usage of material as regards fatique stresses.

It is to be noted that attending personnel standing on the base 21 can step onto the lower members of column 15 whenever the column is lowered to a position to accomodate them. The action of the jack can then be used to position the column 15 upward in an amount which will put the personnel within reach of any level of the tower 18. A person stepping onto the uppermost platform of the tower 18 can have access to the upper portions of the column 15 as the jack 28 is operated at his command.

Figure 3:
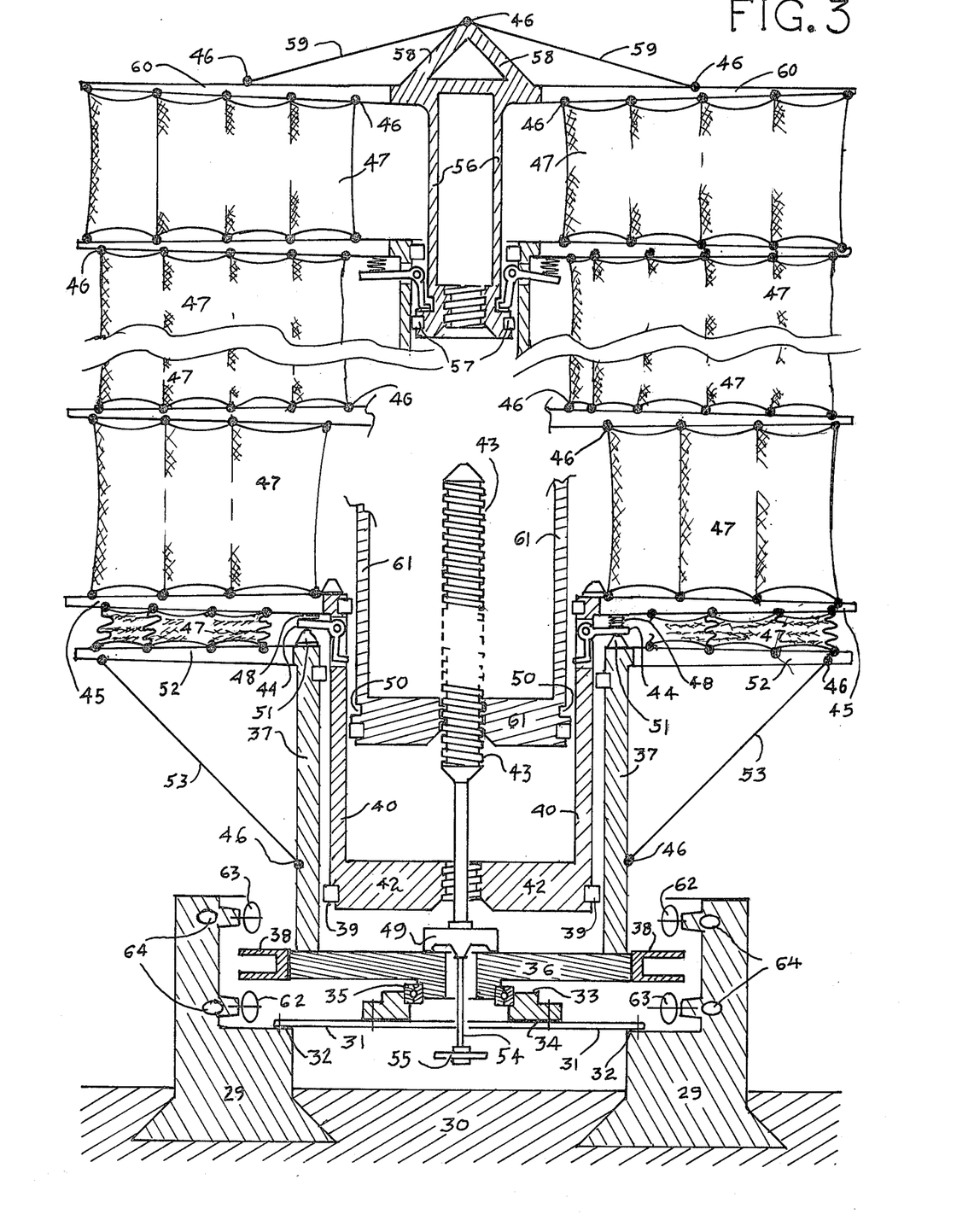
FIG. 3 is a schematic view of a third embodiment, portions being in cross-section.

FIG. 3 is a schematic view representing my invention as an improvement in vertical axis wind turbines having flexible sheet blades stretched between supports somewhat in the manner of sails stretched between spars. A vertical axis windmill using fabric sails shaped into position by wires stretched between end plates on its rotor is described in the publication entitled Windmills For Rural Use, 11 Aero Report 77 FM 14 represented at the International Solar Energy Congress held at New Delhi, India, Jan. 16-21, 1978 by S. P. Govinda Raju and R. Narismha. That windmill would be more cost effective if it were re-designed to incorporate the features of my invention described in FIG. 3 herein, which figure is now referred to in the following description:

The structural members 29 for the main support of the structure are anchored in the ground 30; and they support diaphragm 31 at fastening surfaces 32, which support the bearing holder 33 at the fastening surface 34. The main bearing is held securely fastened to bearing holder 33, and holds rotor base 36 so as to restrain it radially and vertically while providing a strong bearing to permit its rotation. Integrally attached to rotor base 36 is the hollow column 37, the annular ring 38, and gear box 49.

Bearings 38, which are mounted on hollow column 40 slide or roll vertically on a vertical rail on the inside of column 37; so that column 40 moves up and down in column 37, but is prevented from rotation relative to column 37 by the track-following design of bearings 39 on their respective rails. Bearings 41 on the inside of column 40 accomodate the next-higher hollow column. Base 42 of column 40 has a hole with internal threads sized to fit the external threads of jack shaft 43. Latches 44 are supported by their pivots, which are attached to column 40. Spars 45 are attached to column 40, and are provided with shackles 46 along their lengths on both top and bottom sides for securing the bottom and top edges of blades 47. Compression springs 48 maintain substantial continuous forces on their respective mating lateral projections of latches 44.

A retractible runner typical of my invention comprises items 39, 40, 41, 42, 44, 45, 46, 47, 48, 50 and 51, this combination of components is characteristic of runners intermediate to the uppermost and lowermost runners. In an upward sequence of runners whose hollow columns fit into one another, each successively higher column will have to be smaller than the preceeding one in order that they suitably telescope within each other. The lowermost and uppermost runners are each different from the intermediate runners and are different from each other. The first intermediate runner differs from the other intermediate runners in that it has no latch socket 50.

The lowermost runner comprises rotor base 36, hollow column 37, annular ring 38, bearings 41, spars 52, shackles 46, blades 47, and guys 53. Gear box 49, being mounted on rotor base 36 turns with it, and it supports and drives the jack screw 43 as its output shaft. The input shaft 54 of the gear box is driven by hand wheel 55, it being understood that the shaft may be driven by any of various power means. The uppermost runner comprises hollow column 56, bearings 57, latch sockets 50, guy support frame 58, guys 59, shackles 46 and spars 60.

FIG. 3 shows the uppermost runner fully extended relative to the intermediate runner just under it and the latch of that intermediate runner is held by spring action into the latch socket 50 on hollow column 56. It will be noted that the base of column 56 is far clear of the top of jack screw 43, and that the blades have been pulled taut between spars 60 and the spars of the intermediate runner next below. It will further be noted that in the partially deployed status illustrated the internal threads in the hole at the base of intermediate runner 61 are engaged with the threads of the jack screw 43, so that in response to any drive rotation applied at wheel 55 runner 61 and all runners above it move up and down together as the wheel 55 is turned. If the jack screw is driven a sufficient number of turns in the direction to increase the deployment of the rotor assembly, the lower sides of the latch holes 50 in the bottom of hollow column 61 will engage the tips of latches 44; and as travel continues upward will start lifting column 40 by means of the forces between the tips of the latches and the sides of the latch holes. As the jack screw continues to raise the assembly of runners, the lateral arms of latches 44 are lifted away from engagement with bumpers 51 attached to spars 52 so that springs 48 force latches 44 to rotate their tips forcefully into latch holes 50. As the assembly of runners is raised still further, the threaded hole in runner base 42 rises into engagement with the lowermost thread on jack screw 43. Continued rotation of the jack screw in the same direction raises the threaded hole in the base of column 61 so that it passes beyond the top end of the jack screw. Thus the only threaded hole then remaining in engagement with the threads on the jack screw are those in the hole in base 42. Continued turning of jack screw 43 will extend the whole assembly of runners into full deployment, and all of the blades 47 will be pulled taut into airfoil shapes determined by the shapes of the spars. The rotor may be retracted at any time by turning drive wheel 55 in the reverse direction, in which case the telescoping runners will engage in turn the upper thread of the jack screw 43 and will be disengaged from the latch of the next-below rotor. When fully retracted the runners of the rotor assembly will be nested inside each other, and the blades 47 will be relaxed and bunched between their respective spars.

When the wind machine illustrated in FIG. 3 is operating in the fully deployed mode in gentle winds the rotor turns slowly in its main bearing 35 and sustains a slight tilt by reason of the elastic property of the diaphragm 31; and ring 38 rotates clear of wheels 62 and 63. Stronger winds cause further tilt of the rotor and further flexing of the diaphragm so that ring 38 engages one or more of the wheels 63. The rotor is thus restrained more forcibly against tilt, and additional stresses due to the higher winds are not applied to the main bearing 35.

With further reference to FIG. 3, strain gauges 64 are imbedded in base 29 in locations which make them sense the strains put on the axles of their respective wheels 63; and the stresses indicated in each of them is displayed in instrumentation applicable by those skilled in the art. It is an important disclosure of my invention that when indications originating in the strain gauges reach a magnitude representing a stress slightly above a conservative rating for the wheels and the other structural members of the system, that the deployment of the rotor will be somewhat retracted by rotating wheel 55, and that the rotor can be continuously adjusted to accomodate the wind strength and thus convert the maximum amount of wind energy consistent with safe operation. Power can be taken from ring 38 by conventional means comprising belts, ropes, chains or gears which are not illustrated in FIG. 3. At higher winds, when ring 38 is in contact with one or more of wheels 62 and 63, power can be extracted from the axles of the wheels. In typical operation the whole rotor structure leans in a direction and degree caused by the force and direction of the wind, and the extra forces are counteracted by the wheels 62 and/or 63, and the additional power available is transmitted through the wheels and their axles. When the wind becomes less forceful, the restoring force in the elastic diaphragm 31 brings the rotor assembly more nearly vertical so that ring 38 no longer engages the wheels, thus eliminating the friction in the bearings of the wheels to enhance power transmission to the useful output during light winds.

Figure 4:
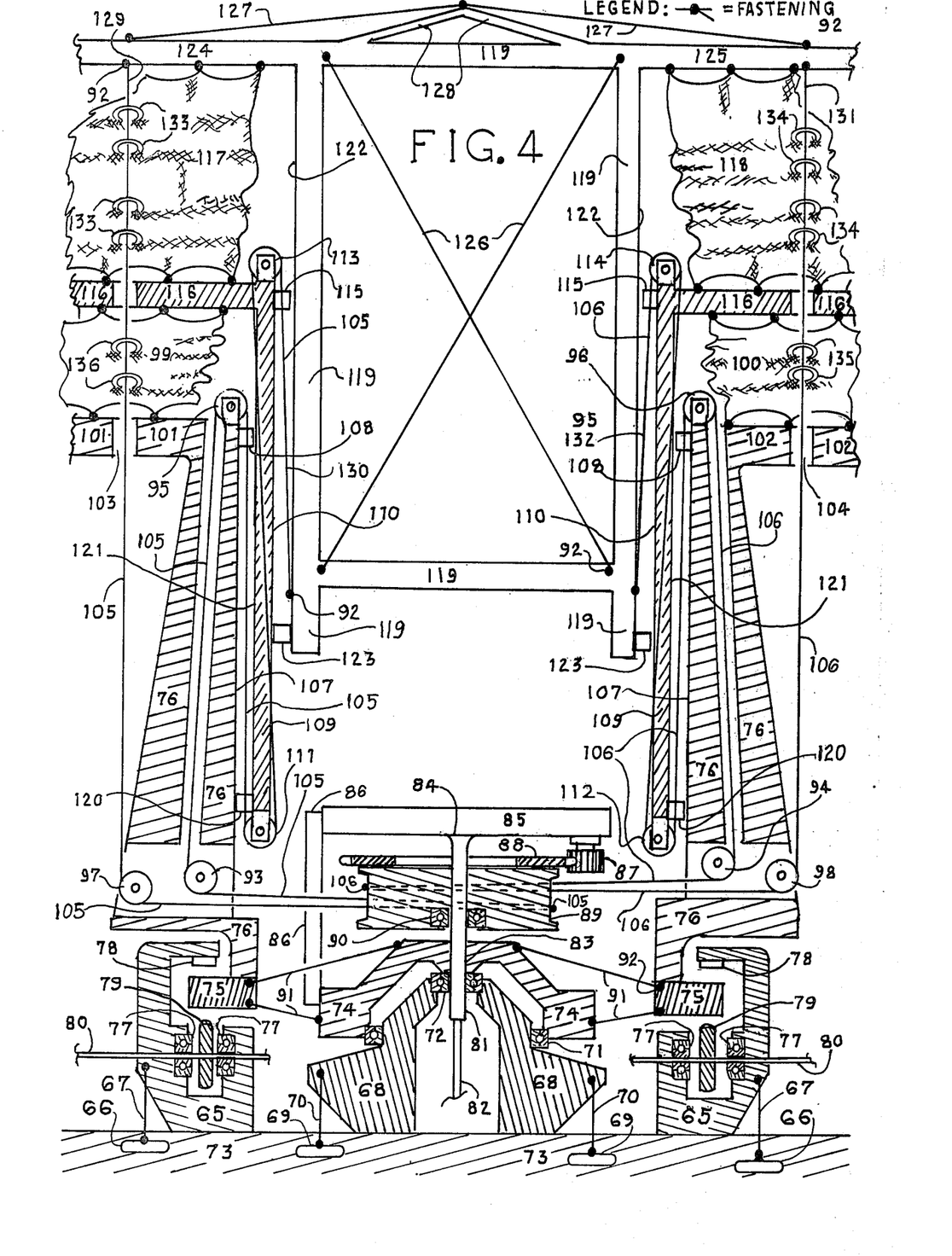
FIG. 4 is a schematic view of a fourth embodiment, portions being in cross-section.

Another embodiment of my invention is disclosed in FIG. 4, which vertical axis windmill permits the use of a rope drive to act as the hoist to raise and lower the runners and at the same time employ the ropes driven to brace the rotor and restrain the flexible blades. In FIG. 4 the whole of the vertical axis wind turbine is supported on the ground or sub-base 73 and is anchored against lateral movement and overturning by anchors 66 and 69. The stationary base 65 is held in place by stays 67 which are securely fastened to anchors 66, fastenings 92 being used to secure the stays at their ends. The body of base 65 provides strong mounting of bearings 77 and of brake shoes 78. It will be noted that in the position of the rotor illustrated in FIG. 4 there is no contact between rotor rim 75 and either brake shoes 78 nor wheels 79; and in this position the whole of the weight of the rotor assembly is borne by bearing mount 68, which is secured in place by stays 70 and anchors 69. The legend for FIG. 4 portrays the symbol 92 used to denote the fastening of the end of a stay or rope to another part.

Referring further to FIG. 4 it is noted that the whole rotor is supported upon its hub 74 and the housing extension 81 of gear box 85, which extension is rigidly fixed at boss 84 to the gear housing of 85. Brace 86 additionally secures gear box 85 to hub 74; and housing extension 81 is rigidly secured to hub 74 at interface 83. The bore hole of bearing 90 is securely fastened to housing extension 81. Hoist drum 98, with its ring gear 88, is mounted securely on the outer diameter of bearing 90. Input shaft 82 to the gear box drives output gear 87 by means of a substantial gear reduction, so that rotation forced upon shaft 82 relative to housing extension 81 will effect rotation of the hoist drum relative to the rotor assembly at a reduced speed and increased torque. Stays 91 act as spokes fastened between hub 74 and rim 75; and outer frame 76 is securely fastened to ring 75. Frame 76 provides secure mountings for the bearing shafts of sheaves 93 to 98, inclusive. Frame 76 also supports spars 101 and 102 thru which holes 103 and 104 are provided to permit passage of ropes 105 and 106, respectively; tracks 107; and track-following bearings 108.

In FIG. 4 intermediate frame 109 supports tracks 110, the shafts supporting sheaves 111 to 114, inclusive; it supports track-following bearings 115; and it supports spars 116. Spars 116 support the fastenings for the lower edges of blades 117 and 118 as well as for the upper edges of blades 99 and 100. Intermediate frame 109 also mounts outer tracks 121 and track-following bearings 120.

Inner frame 119 mounts tracks 122 and track-following bearings 123; and it supports spars 124 and 125. Frame 119 is strengthened by cross braces 126; and spars 124 and 125 are held against excessive bending by stays 127, which are secured to braces 128, which are in turn firmly fastened to frame 119. Spars 124 and 125 support fastenings for the upper edges of blades 117 and 118, respectively. Ropes 105 and 106 pass around hoist drum 89, but are separate ropes driven separately by the drum. End 129 of rope 105 is fastened to spar 124 and its other end 130 is fastened near the lower extremity of frame 119; and end 131 of rope 106 is fastened to spar 125 and its other end 132 is fastened to frame 119 near its lower extremity. Ropes 105 and 106 are stretched to cause them to remain in substantial tension at all positions of travel of frames 109 and 119. Numerals 133 to 136, inclusive, denote loops or grommets on blades 117, 118, 99 and 100, respectively and the taut ropes 105 and 106 passing through these loops gather the flexible fabric of the blades so as to prevent fouling when the blades bunch together when they are furled. Lateral support of the ropes is provided by their contact with the sides of the holes in the spars through which they pass.

In operation the whole of the rotor assembly supported by or riding upon frame 76 in FIG. 4 rotates on bearings 71 and 72; and shaft 82 rotates along with it, if there is no torque applied to it. This is because the whole of the gear box 85 and hoist drum 89 and their associated parts rotate together without any relative motion between the parts of the gear train and the hoist drum. Whenever it is desired to elevate the rotor frames higher into the wind, torque applied to shaft 82 will cause rotation of drum 89 so as to drive ropes 105 and 106 in the manner of belts, so that frame 119 will be forced upward by reason of increased tension at rope ends 130 and 132, and reduced tension at rope ends 129 and 131. All the while this upward travel is occuring, and after it reaches its limit by reason of bearings 123 striking bearings 115, the tension in rope ends 129 and 131 remains sufficient to act as a strengthening stay on spars 124 and 125, and so also to strengthen and restrain bending in the various frames. As driving rotation continues at shaft 82 after bearings 123 strike bearings 115, the further movement of ropes 105 and 106 around sheaves 113, 111 and 114, 112 respectively, is prevented, and frame 109 begins upward travel. Continued driving of the hoist brings bearings 120 into contact with bearings 108; and this condition represents full deployment of the wind turbine. At this point the driving torque is removed from shaft 82, and the blades are stretched to gain full power from the wind. At light winds, as well as at higher winds, power can be taken from the rotor at housing extension 81 or by a belt on the outer periphery of frame 76. However, during light winds rim 75 is not in contact with wheels 79 so that no power is then available at shafts 80.

In strong winds the increased overturning moment will cause increased tension in some of the stays 91, and will cause relaxation in others, so that their elasticity will permit the tilting of the whole frame 76 and the rim 75 to a degree that brings the lower surface of rim 75 into driving contact with one or more of wheels 79. Thus, in strong winds, power may be taken from one or more of shafts 80. Even stronger winds will bring the upper surface of rim 75 into rubbing contact with one or more brake shoes 78; and this friction will generate heat in rim 75 and limit the speed of the whole rotor assembly. If the winds grow even stronger, the overturning moment and stresses in the various members of the system be limited by turning shaft 82 in the direction which lowers the height of the rotor by withdrawing the frames in telescoping fashion into one another.

Figure 5:
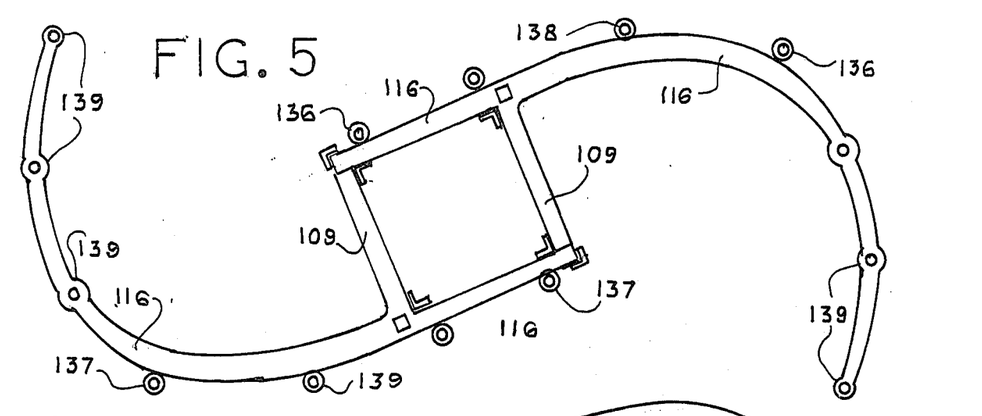
FIG. 5 is a schematic view of a portion of the runner and spar components.

FIG. 5 is presented to illustrate a preferred shape for blades, and is a partial plan view of spars 116 schematically represented in FIG. 4. The shape illustrated in FIG. 5 for the spars, such as 116, is a preferred shape; but those skilled in the art might prefer to design different detailed contours of shape for construction according to my invention. Rings such as 136 and 137 are made integral parts of the spars; and ropes 105 and 106 pass through them, respectively. Additional rings such as 139 are provided for additional ropes installed according to the design used for employing ropes 105 and 106. It is to be noted that FIG. 5 illustrates a general plan, and that details may be different for different applications of my invention. For example, frame 109 may be constructed so that it is either open or closed to lateral air flow.

Figure 6:
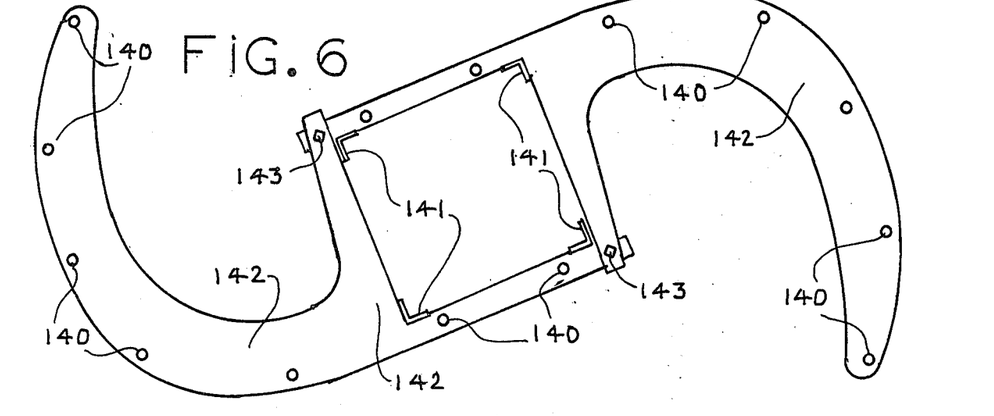
FIG. 6 is a schematic view of an assembled pair of ribs for stiffening airfoils.

FIG. 6 disclosed a different pair of stiffening ribs. Ropes such as 105 and 106 pass through holes 140 in such ribs; and bearings 141 attached to the assembly allow the pair of ribs to move vertically between spars such as 101, 102, 116 and 125. Some of the loops 133 and 134, which are attached to the blade fabric such as 117 and 188, may also be attached to holes 140 so as to vertically hold the FIG. 6 rib assemblies at desired intervals along the vertical extent of the blades when they are deployed. The two ribs 142 are preferably identical to each other; and are assembled to each other by fastenings at points 143. According to my invention when the telescoping runners are retracted into each other, ribs 142 are moved vertically towards each other with their respective adjacent parts of the fabrics comprising blades 99, 100, 117 and 188 so that the fabric is gathered and compressed between the ribs. The ribs may be of light weight, thin construction. The width of the ribs serves the further function of retaining the gathered folds of the blade fabric so as to prevent fouling and to prevent undue flapping in the wind.

Figure 7:
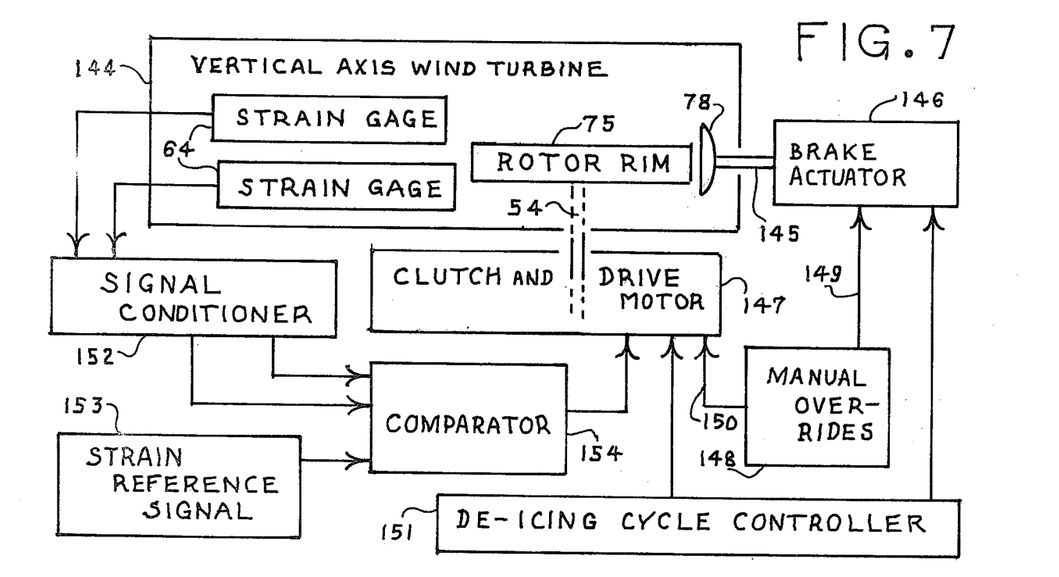
FIG. 7 is a block diagram schematic which clarifies interrelations amongst controls, subsystems, and elements of another embodiment of my invention.

In FIG. 7 wind turbine 144 contains strain gauges 64 which generate signals proportional to the strains in selected places in the structure and transmit their signals to their respective circuits in signal conditioner 152. The signals, suitably conditioned, flow from signal conditioner 152 to comparator 154; and at the same time a reference signal is furnished from reference signal source 153 to the comparator. Comparator 154 is so designed that if any strain gauge signal exceeds the reference signal, a signal from the comparator to clutch and motor drive 147 actuates the clutch to engage with shaft 54 and also energized the motor 147 in a direction which starts retracting the runners in turbine 144. As a result of this rotation the strain will be less, the strain signals to 154 will be less, and the signal from 154 to 147 will cease. Thereupon the runners in turbine 144 will stay in their relative vertical reduced deployment, and the rotor will continue to rotate and produce useful power. A further design feature of the comparator 154 is that it will sense a condition whereby both of the strain gauge signals presented to it are suitably low as compared to the reference signal, and by reason of this condition will provide actuating signals to drive 147 to engage the clutch and drive the motor in a direction to increase the deployment of the runners. Thus my invention provides a closed circuit control system which intercepts the most area of wind stream cross section permitted by allowable stress ratings for the constituent parts.

In FIG. 7 de-icing cycle controller 151 is designed so that it can be turned on manually at will whenever it is desired to prevent ice accumulation on the parts of the system which might otherwise be jammed by the weather conditions. Controller 151 has a timing cycle, which may be changed in period to suit conditions. Each cycle includes full travel and return of the mechanism of deployment driven by shaft 54, and brake linkage 145. This periodic travel causes the repeated collasping and stretching of the blades in turbine 144, prevents the accumulation of damaging thicknesses of ice. Manual over-ride controls 148 permit the positioning of the shaft 54 and actuator linkage 145 at will for any reason of servicing or selected status of usage.

The invention can involve an apparatus for conversion of wind energy into rotational power comprising: a base; a rotating mast adapted to rotate about a generally vertical axis; flexible airfoil sails extending somewhat horizontally from the vertically disposed mast, and adapted to catch the wind and rotate the mast, there being a pair of airfoils at each of a plurality of heights along said rotating mast; a plurality of airfoil support members, each of some of the upper support members securing the bottom of an airfoil above it and the top of an airfoil below it; telescoping means adapted to permit said airfoil support means to be lowered into a storage mode in which at least some of the airfoils are stored in a zone protected from some of the effects of a windstorm; said telescoping means being a part of the rotatable mast means, whereby the number of sails exposed to the wind and the tautness of at least some of the sails can be adjusted by the extent of the upward movement of the telescoping mast; resilient means urging the rotating mast into a standard vertical position, but adapted to permit the rotating mast to tilt not more than a controlled angle in response to the wind, thereby permitting the airfoils more efficiently to rotate the mast; output transmission means directing power to at lease one transducer; moderate duty power transmission means adapted to transmit power from the rotating mast to said output power transmission means; heavy duty power transmission means adapted to transmit power from the rotating mast to said output transmission means; control means actuated by the tilt of the mast for utilizing said moderate duty power transmission means during the standard vertical positioning of the mast and for utilizing said heavy duty power transmission means during the rotating of the mast at a controlled amount of tilt; strain gauge means in the base responsive to the strain of tilting of the mast, said strain gauges detecting any dangerous wind velocities at the airfoils for lowering the airfoils and mast for storage during windstorms.

The invention can involve apparatus for wind energy conversion system comprising vertically translatable components variably moved into the wind stream.

The invention can involve apparatus for a vertical axis wind turbine for converting wind energy into useful mechanical energy and retracting to intercept a wind stream of smaller cross section during higher winds.

The invention can involve apparatus for a vertical-axis wind turbine wherein blades are deployed and retracted approximately vertically as attachement to runners rotating about the axis.

The invention can involve a self-erecting wind turbine wherein telescoping runners are raised and lowered by hoist-driven ropes, which ropes pass through holes in spars borne by the runners so as to provide lateral restraint to blades suspended between said spars.

The invention can involve a wind energy conversion system comprising: a vertical axis wind turbine wherein stresses in structural members are monitored by strain gauges, whose wind-affected area is variable by adjustment means, and whose rotation can be arrested by brake means; signal conditioner getting its inputs from said strain gauges and furnishing its output to a comparator; strain reference signal source furnishing signal as an input to said comparator; subsystem comprising a clutch, a motor, and control means for them, which motor and clutch drive the variable adjustment means;

controls for manually overriding autonomous operation of the system; brake actuator receiving control signals from de-icing controller, which controller also transmits signals to the controls for the clutch and motor; interconnections and adjustments such that in automatic operation the system deploys the maximum area into the wind compatible with acceptable magnitudes of stress in structural members.

The invention can involve a self-erecting wind turbine with self-contained hoist means used to deploy airfoils while wind power is being converted, which hoist means is used to provide lifting and lowering force for erection when the turbine is out of service for transport and reinstallation.

The invention can involve a windmill comprising: wind-driven runners telescoping vertically within each other; mechanism driving the runners vertically; means securing runners at limits of travel relative to adjacent runners; and means permitting vertical motion of telescoping means while wind-driven runners are in rotation.

The invention can involve an apparatus for a vertical-axis wind turbine wherein useful output energy is derived from rotary motion of the rotor and swaying motion of the rotor. This desirable conversion of power from both rotary and swaying motion simultaneously provides the ability to derive power from wind gusts and other characteristics of the wind which cause the wind turbine to tilt and recover recurrently.

Wind machines made according to my invention can furnish usefull amounts of output power at light wind velocities in the range of four to ten miles per hour, and appreciably more power in gentle winds of eight to twelve miles per hour. At moderate to fresh winds having velocities of thirteen to twenty four miles per hour substantial power is produced by retractable wind machines of my invention, and in this range of wind speeds the vertical retraction would be partial. In strong winds of twenty five to thirty eight miles per hour my invention permits full retraction of the wind machine, and it continues to operate at substantially full power rating in this range of wind speeds. In gale winds of thirty nine to 54 miles per hour or faster my wind machine is fully retracted and its brakes are applied to limit speed, but full output power is nevertheless available. At winds faster than 55 miles per hour it is expected that users of my invention will use the brakes to bring the mechanical motions to a halt and to stop the power output. A typical wind machine of my invention is expected to convert power from the wind according to the following schedule, the figures therein being approximations:

| Wind velocity, miles per hour | Power output, horsepower |
|---|---|
| 2 and slower | 0 |
| 3 | 0.1 |
| 5 | 1 |
| 10 | 8 |
| 15 | 27 |
| 20 | 38 |
| 30 | 40 |
| 40 | 42 |
| 50 and faster | 0 |

What is claimed is:

1. Apparatus for conversion of wind energy into rotational power comprising:
a base;
a rotating mast adapted to rotate about a generally vertical axis;
flexible airfoil sails extending somewhat horizontally from the vertically disposed mast, and adapted to catch the wind and rotate the mast, there being a pair of airfoils at each of a plurality of heights along said rotating mast;
a plurality of airfoil support members, each of some of upper support members securing the bottom of an airfoil above it and the top of an airfoil below it;
telescopic means adapted to permit said airfoil support means to be lowered into a storage mode in which at least some of the airfoils are stored in a zone protected from some of the effects of a windstorm;
said telescoping means being a part of the rotatable mast means, whereby the number of sails exposed to the wind and the tautness of at least some of the sails can be adjusted by the extent of the upward movement of the telescoping mast;
resilient means urging the rotating mast into a standard vertical position, but adapted to permit the rotating mast to tilt not more than a controlled angle in response to the wind, thereby permitting the airfoils more efficiently to rotate the mast;
output transmission means directing power to at least one transducer;
moderate duty power transmission means adapted to transmit power from the rotating mast to said output power transmission means;
heavy duty power transmission means adapted to transmit power from the rotating mast to said output transmission means;
control means actuated by the tilt of the mast for utilizing said moderate duty power transmission means during the standard vertical positioning of the mast and for utilizing said heavy duty power transmission means during the rotating of the mast at a controlled amount of tilt;
strain gauge means in the base responsive to the strain of tilting of the mast, said strain gauges detecting any dangerous wind velocities at the airfoils for lowering the airfoils and mast for storage during windstorms.

2. Apparatus for the conversion of wind energy into rotating power comprising:
a base;
a wind turbine having an expandable-contractable tower-like mast rotated by the action of the wind upon the wind turbine;
a bearing on said base permitting rotation of said mast about a generally vertical axis, there being no top bearing, or support for said mast, whereby said base and bearing are the sole support for the mast;
at least one power output shaft means;
moderate duty power transmission means involving minor frictional losses adaped to transmit power from the rotating mast to said output shaft means during light and moderate winds;
heavy duty power transmission means involving larger frictional losses than said moderate power transmission means, said heavy duty power transmission means being adapted to transmit power from the rotating mast to said output shaft means;
control means for actuating use of said heavy duty power transmission instead of said moderate duty power transmission during periods of availability of relatively stronger winds.

3. Apparatus for the conversion of wind energy into rotating power comprising:
a base;
a wind turbine having an expandable-contractable tower-like mast rotated by the action of the wind upon the wind turbine;
a bearing on said base permitting rotation of said mast about a generally vertical axis, there being no top bearing or support for said mast, whereby said base and bearing are the sole support for the mast;
resilient means urging the mast into a truly vertical position, but yieldingly permitting the tilting of said mast a controlled amount;
at least one power output shaft means;
moderate duty power transmission means involving minor frictional losses adapted to transmit power from the rotating mast to said output shaft means while the mast is vertical;
heavy duty power transmission means involving larger frictional losses than said moderate power transmission means, said heavy duty power transmission means being adapted to transmit relatively large amounts of power from the rotating mast to said output shaft means when the mast is tilted to said controlled amount, said heavy duty power transmission means comprising an annular ring near the bottom of the mast, said annular ring being disengaged from a plurality of wheels during untilted rotation of the mast but engaging and rotating at least one wheel during rotation of the mast when tilted to said controlled amount, such tilting being attributable to strong winds.

4. A vertical axis wind turbine according to claim 3 wherein the airfoils are colla psible sheets which are stretched taut when the mast is expanded to its uppermost position.

5. A vertical axis wind turbine comprising:
a base;
at least one bearing on said base, a mast being mounted for rotation about a generally vertical axis solely by reason of such engagement with bearing surfaces in the base and without any top bearing and without any top support for the mast, whereby said base and said bearing surfaces are the sole support for the mast;
resilient means urging the bearing, and thus the mast, into true verticality, said resilient means yieldingly permitting the bearing and thus the mast to tilt a controlled amount;
a ring member rotatable with the mast and adapted to strengthen the mounting of said mast;
an annular groove in the base adapted to receive said ring of the mast and to be approximately vertically evenly spaced from the top and bottom of said groove when the mast is truely vertical; and
bearing surfaces on the upper and lower surfaces of said groove, adapted to provide bearing surfaces for said ring when the mast is tilted said controlled amount.

6. A vertical axis wind turbine in accordance with claim 5 having heavy duty power take-off means adapted to be engaged whenever the mast is tilted said controlled amount.

7. A vertical axis wind turbine in accordance with claim 5 in which braking surfaces adapted to slow down the rotation of the mast are provided at appropriate portions of said groove, whereby excessive tilting of the mast actuates a braking action for slowing down the rotation of the mast.

8. A self-erecting wind turbine, adapted to be contractable into a storage mode during transportation and during windstorms, and adapted to be frequently adjusted to a variety of intermediate expansions during use to adapt to variations in the gustiness and strength of the wind for achieving an appropriate power yield from the wind while still safeguarding the mast from overturning moments, said turbine comprising:
a base;
at least one bearing in said base, said bearing providing a mounting for a mast rotating about a vertical axis;
a vertical mast rotatable about a generally vertical axis, said mast comprising a plurality of telescoping members adapting said mast to be contracted and expanded to be mounted in the base solely by reason of engagement with bearing surfaces in the base and without any top bearing and without any top support, whereby said base and said bearing surfaces are the sole support for the mast;
a plurality of frames, each frame being attached to a telescoping member of said mast, said frames telescoping for compact storage when in the storage mode;
airfoils carried by said frames, the wind catching the airfoil s to rotate the mast;
hoist means comprising a drum, pulleys, and ropes secured to the drum and uppermost of said telescoping members of the mast, whereby all contraction and expansion of the mast is conducted while maintaining substantial tautness of the ropes.

9. A self-erecting wind turbine in accordance with claim 8 in which said flexible sheet airfoils have loops accomodating some of the ropes of the rope and pulley means.

10. A vertical axis wind turbine comprising:
a base;
at least one bearing in the base;
an expandable-contractable mast having a plurality of telescoping members, said mast extending upwardly from the base without any top support or top bearing, said mast being adapted for rotation about a generally vertical axis by reason of engagement with at least one of said bearings in the base;
a plurality of support members, each support member being attached to a telescoping member of said mast;
flexible sheet airfoils carried by said support members, said airfoils catching the wind to rotate the mast when the mast is in an at least partially expanded position;
hoist means adapted to control the extent to which said mast is expanded;
means adapted to transmit power from the rotating mast to activate said hoist means to provide lifting or lowering of said mast.

11. Apparatus in accordance with claim 10 comprising:
a base;
a mast rotatable about a generally vertical axis;
a bearing on said base permitting rotation of said vertical mast about a generally vertical axis, said base and bearing a bottom and sole support for said mast, there being no top support for said mast;
airfoil supporting members extending laterally from said mast;

airfoils supported by the airfoil supporting means;

means to usefully transmit power resulting from torque produced by rotation of the mast by wind forces;

expandable-contractable tower means comprising said mast, airfoil supporting members, and airfoils, adapted to permit the mast to be raised to its uppermost position to subject the maximum airfoil area to the wind, adapted to permit the mast to be raised to any of a plurality of intermediate positions to subject an intermediate cross sectional area of airfoil to the wind, and adapted to be lowered downwardly for temporary storage with substantially no cross sectional area of airfoil subjected to the wind, said base, mast, bearing, airfoil supporting members, airfoils, and tower being adapted for factory assembly, shipment in lowered condition, and raisable after arriving at the site of use.

12. Apparatus in accordance with claim 10 comprising:

a base;

a mast rotatable about a generally vertical axis;

a bearing on said base permitting rotation of said mast, there being no top bearing or support for said mast, whereby said base and bearing are the sole support for the mast;

a plurality of airfoils catching the wind to rotate said mast, said airfoils being flexible sheets adapted to dampen variations of the wind, whereby unwanted vibrations are not transmitted to the apparatus.

13. A vertical axis wind turbine in accordance with claim 10 having a base;

a vertical mast rotatable about a generally vertical axis, said mast comprising telescoping members adapting said mast to be contracted and expanded at frequent intervals to adapt to variations in the gustiness and strength of the wind for achieving an appropriate power yield from the wind while still safeguarding the mast from overturning moments;

at least one bearing on said base, said mast being mounted for rotation about a vertical axis solely by reason of such engagement with bearing surfaces in the base and without any top bearing and without any top support, whereby said base and said bearing surfaces are the sole support for the mast;

telescoping support members attached to the upper portions of each telescoping member of the mast; and airfoils secured to said support members, whereby the wind rotates the mast.

14. A vertical axis wind turbine comprising:

a base;

at least one bearing in the base;

a mast extending upwardly from the base without any top support or top bearing, said mast being adapted for rotation about a generally vertical axis by reason of engagement with at least one of said bearings in the base;

resilient means urging the mast into a truly vertical position when there are gentle winds, but yieldingly permitting the tilting of said mast a controlled amount in response to gusts or strong winds;

power take-off means engageable by said tilting of said mast a controlled amount whereby the gustiness of the wind is transformed into useful power, the swaying of the mast supplementing the power generated by the rotation of the mast;

airfoils supported on the mast in such a manner that the wind rotates the mast.

15. A windmill comprising:

a base;

at least one bearing in the base;

a mast extending upwardly from the base without any top support or top bearing, said mast being adapted for rotation about a generally vertical axis by reason of engagement with at least one of said bearings in the base, said mast comprising a plurality of telescoping frames;

at least one airfoil support on each of said frames, the association of the airfoil supports and telescoping frames permitting the mast and airfoil supports to be telescoped into a compact contracted space for storage mode;

flexible sheet airfoils secured at the top and bottom to supports extending from successive frames of the telescoping frames; whereby the wind-exposed area of the airfoils is controlled by the extent to which the telescoping frames are expanded toward the maximum height of the mast;

means for adjusting the partial expansion of the mast to obtain appropriate power from the windmill without excessively risking the overturning moment exerted on the windmill by the wind.

16. A windmill in accordance with claim 15 wherein:

runners telescope within one another;

a latch, bolt or similar fastening device secures the telescoping runners to one another rigidly at the extremes of their telescoping travel.

17. A windmill in accordance with claim 15 having means for increasing or decreasing the total height of the rotating structure wherein:

telescoping members are secured by latches at the extremes of their respective travels;

a jack screw rotating in a base-supported bearing extends vertically part way to the top of the structure;

a threaded hole in the lower part of each telescoping member moves vertically into successive engagement and disengagement with the jack screw;

upward travel of a telescoping member, as it nears the upper end of its travel in engagement with the lead screw, lifts the next-lower telescoping member up from its position of rest and in doing so latches together the two members in vertical motion.

18. A vertical axis wind turbine comprising:

a base;

at least one bearing in the base;

a mast extending upwardly from the base without any top support or top bearing, said mast being adapted for rotation about a generally vertical axis by reason of engagement with at least one of said bearings in the base;

a plurality of telescoping members in said mast adapting said mast to be contracted into storage mode during windstorms and during transportation from a factory to a location of use;

a plurality of ropes and pulleys constantly maintained taut for raising and lowering said telescoping members of said mast, said ropes being secured to a drum of a hoist and to the uppermost of said telescoping members;

supporting members extending laterally from the upper portion of each of said telescoping members;

airfoils in the form of flexible sheets secured to the supporting members of a pair of successive telescoping members;

resilient means urging the mast into a truly vertical position, but yieldingly permitting the tilting of said mast a controlled amount;

heavy duty power takeoff means engaged by the tilting of the mast by said controlled amount;

said wind turbine being adapted to rotate in mild winds when most expanded to its uppermost position at which all airfoils are drawn reasonably taut, and to normally operate at an intermediate expansion adapted to withstand the turning moment imposed by the wind, and to be operating at various intermediate positions, oftentimes with tilting to the controlled amount, thereby benefitting from the gustiness of winds, and to be fully contracted into storage mode during windstorms.

19. Apparatus for the conversion of wind energy into rotating power comprising:

a base;

a mast rotatable about a generally vertical axis;

a bearing on said base permitting rotation of said vertical mast about a generally vertical axis, said base and bearing a bottom and sole support for said mast, there being no top support for said mast;

airfoil supporting members extending laterally from said mast;

airfoils supported by the airfoil supporting means;

means to usefully transmit power resulting from torque produced by rotation of the mast by wind forces;

expandable-contractable tower means comprising said mast, airfoil supporting members, and airfoils, adapted to permit the mast to be raised to its uppermost position to subject the maximum airfoil area to the wind, adapted to permit the mast to be raised to any of a plurality of intermediate positions to subject an intermediate cross sectional area of airfoil to the wind, and adapted to be lowered downwardly for temporary storage with substantially no cross sectional area of airfoil subjected to the wind, said base, mast, bearing, airfoil supporting members, airfoils, and tower being adapted for factory assembly, shipment in lowered condition, and raisable after arriving at the site of use;

means in which airfoils are secured to upper and lower airfoil supporting means, and in which the vertical distance between a pair of airfoil supporting means can be regulated by the adjustment of the expandable-contractable tower means, whereby said airfoils have the maximum cross sectional area when the tower is fully raised, and whereby some airfoils are less taut and have less cross sectional area when the tower is partially raised.

20. A vertical axis wind turbine comprising:

a base;

a vertical mast rotatable about a generally vertical axis, said mast comprising telescoping members adapting said mast to be contracted and expanded at frequent intervals to adapt to variations in the gustiness and strength of the wind for achieving an appropriate power yield from the wind while still safeguarding the mast from overturning moments;

at least one bearing on said base, said mast being mounted for rotation about a vertical axis solely by reason of such engagement with bearing surfaces in the base without any top bearing and without any top support, whereby said base and said bearing surfaces are the sole support for the mast;

telescoping support members attached to the upper portions of each telescoping member of the mast;

airfoils secured to said support members, whereby the wind rotates the mast; and flexible sheet airfoils attached to the supports from a pair of adjacent telescoping members of the mast, said airfoils being adapted to be stretched taut when the mast is fully expanded.

21. A vertical axis wind turbine in accordance with claim 20 having heavy duty power take-off means adapted to be engaged whenever the mast is tilted said controlled amount.

* * * * *